United States Patent Office 2,897,168
Patented July 28, 1959

2,897,168
METHOD OF INCREASING THE PARTICLE SIZE OF SYNTHETIC RUBBER LATEX POLYMERIZATE

Robert W. Brown, Naugatuck, Conn., assignor to United States Rubber Company, New York, N.Y., a corporation of New Jersey No Drawing. Application May 2, 1955
Serial No. 505,531

4 Claims. (Cl. 260—29.7)

This invention relates to increasing the particle size of synthetic rubber latices, particularly in the manufacture of low viscosity, high solids latices.

Synthetic rubber latices are prepared by emulsion polymerization of the rubber-forming monomers, e.g. butadiene and styrene, at temperatures in the range from 100° C. to —40° C., where an anti-freeze, e.g. methanol, has been added. The solids concentration of the latex as taken from the reactor is frequently less than 40%, and where the latex is to be used directly, as in the manufacture of sponge rubber, the latex concentration is increased by evaporation of water. Due to the small particle size of such latices, i.e. 600 to 1200 Angstrom units average particle diameter, their viscosity is very high when concentrated to 50% solids concentration, and over. Some special techniques have been developed for making higher solids latices, i.e., up to 55% to 60% solids concentration, such latices having a larger particle size, e.g. up to 2500 Angstrom units average particle diameter, but these methods have various disadvantages. All average particle diameter measurements referred to herein are based on the weight average of the particles. Such measurements may be made by means of electron microscope photographs, or may be calculated from turbidity measurements.

Several methods have been suggested for increasing the particle size of a given latex by partial destruction or destabilization of the emulsifier system, e.g., by partial acidification by one means or another, by addition of electrolytes, and by addition of acetone. Such methods tend to cause macroscopic coagulum particles in the latex which must be filtered. By the present invention, the growth in patricle size of synthetic rubber latices can be brought about without addition of a destabilizer and without any destruction of the emulsifier system.

In carrying out the present invention, there is added to the synthetic rubber latex a relatively large amount of water-insoluble, volatile organic liquid that is a swelling agent for the synthetic rubber, the latex is maintained in contact with the swelling agent until the desired increase in particle size has been accomplished, and the swelling agent is then removed from the thus treated latex. One advantage of this new method of agglomeration is that since it does not destroy the emulsifier system there is much less danger of causing any appreciable amount of macroscopic coagulum either locally at the point of addition, or generally throughout the latex as is the case when other methods of agglomeration are used. A further advantage is that no foreign material is left in the latex after agglomeration and stripping.

The synthetic rubber latex to be treated should have a ratio of synthetic rubber to water phase (any water soluble anti-freeze being included in the water phase) from .5/1 to 1.2/1, which is a solids concentration range from about 33% to about 55%. Generally, the synthetic rubber latex to be treated will have an average particle diameter of 600 Angstrom units to 2500 Angstrom units, i.e., the range of particle size made directly in the reactor.

If desired, the particles of a latex of larger particle size that may previously have been enlarged by the present or other methods, for example, particles having an average particle diameter up to 3000 Angstrom units, may be further enlarged by the present invention.

Organic liquids that are swelling agents for various rubbers are well known. Such agents may be defined, if desired, as those capable of swelling the solid rubber to at least twice its volume when immersed in the solvent for 72 hours at room temperature. A single such swelling agent or a mixture of two or more may be used. Swelling agents for various synthetic rubbers are aliphatic and aromatic hydrocarbons and halogenated hydrocarbons boiling from —50 to +200° C. Examples of such swelling agents for synthetic rubbers are propane, butane, isobutane, 1-butene, 2-butene, isobutylene, butadiene, the isomeric pentanes and pentenes, isoprene, hexane, cyclohexane, the isomeric octanes and octenes, benzene, toluene, xylene, styrene, cumene, methyl chloride, methylene chloride, chloroform, carbon tetrachloride, ethylene dichloride ethyl-bromide, chlorobenzene. Because of their availability in large amounts and high swelling action, one or more of the polymerizable monomers used in preparing the latex are often preferred swelling agents. However, no further polymerization should take place during the treatment of the latex with the swelling agent, since this might initiate new small polymer particles. This is readily accomplished by adding a conventional shortstopping agent to the latex where polymerizable monomers are used as swelling agents. The organic solvent used in any case, should, of course, be a swelling agent for the particular synthetic rubber in the latex. The amount of swelling agent added to the latex is that amount which will impart to the latex a ratio of organic phase (synthetic rubber polymer and swelling agent) to water phase (water and any water-soluble anti-freeze) in the range of 1.4/1 to 3/1. In other words, the ratio of organic phase of the latex to water phase is increased from within the range of .5/1 to 1.2/1 to within the range of 1.4/1 to 3/1 by the addition of the swelling agent. The latex containing the swelling agent is treated at a temperature between the freezing point of the latex and 100° C. for a time sufficient to increase the particle size of the latex to the desired extent, generally to provide an increase in the average particle diameter of the latex of at least 300 Angstrom units. The final enlarged average particle diameter may be up to 5000 Angstrom units. The time of treating the latex in the presence of the swelling agent will generally be at least one-half hour and may be as much as ten hours. After such treatment, the swelling agent may be removed by venting, as in the case of swelling agents that are gases at atmospheric pressure, e.g. butadiene, or by vacuum or steam distillation in the case of swelling agents that are liquid at atmospheric pressure at the temperature of the latex. The removal of the swelling agent may be concurrent with an evaporation concentration of the latex.

The polymerizable material in the preparation of the synthetic rubber latex may be one or a mixture of butadienes-1,3, for example, butadiene-1,3, isoprene, chloroprene, cyano-butadiene-1,3, 2-phenyl butadiene-1,3, piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthylene; alpha-methyl styrene, para chlorostyrene, dichlorostyrene, alpha-methyl dichlorostyrene; the alpha-methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidine chloride; alpha, beta and gamma vinyl pyridines, 5-ethyl-2-vinyl pyridine, 2-methyl-5-vinyl pyridine, vinyl carbazole. Such a synthetic rubber latex may generically be termed a "butadiene polymer synthetic rubber latex."

The following examples illustrate the invention. All parts, percentages, and ratios referred to herein are by weight.

*Example I*

A latex was prepared by polymerizing at 5° C. the following recipe: 50 parts of butadiene-1,3, 50 parts of styrene, 140 parts of water, 0.04 part of potassium hydroxide, 5 parts of potassium soap of disproportionated abietic acid, 1 part of potassium chloride, 0.1 part of di-isopropylbenzene hydroperoxide, 0.003 part of ferrous sulfate heptahydrate, 0.1 part of sodium formaldehyde sulfoxylate, 0.012 part of ethylenediamine tetraacetic acid and 0.4 part of tert.-dodecyl mercaptan. After 85% conversion of monomers to polymer, the reaction was shortstopped by the addition of 0.2 part of potassium dimethyl dithiocarbamate. The latex was steam distilled to remove unconverted monomers, and was then concentrated by heating under vacuum until the solids content was 49.4%. This will be termed the original latex.

To 200 parts of the original latex having a ratio of rubber to water phase of 1/1 was added 176 parts of benzene and 50 parts of water, thereby increasing the ratio of organic phase (rubber+benzene) to water to 1.8/1. The mixture was gently stirred and heated for one hour at 60–70° C. After the heating period, the latex was removed to disc concentrator, diluted somewhat, and then reconcentrated with concurrent removal of the benzene to the same concentration as the original latex. A comparison of the original latex and the thus treated enlarged particle latex is shown in the following table:

| | Original latex | Treated latex |
|---|---|---|
| Percent solids | 49.4 | 49.5 |
| Viscosity (centipoises) | 780 | 35 |
| Turbidity | 0.22 | 2.40 |
| Average particle diameter (Angstrom units) | 1,000 | 3,000 |
| Surface tension (dynes/cm.) | 60.5 | 34.5 |

It is apparent that a large increase in particle size has been caused, with an accompanying improvement in the viscosity and surface tension of the latex.

The turbidity in this and the other examples was measured by diluting a 0.5 g. sample to an optical density of about 0.1, by visual estimation, and then measuring the optical density (K) in a Beckman Model DU spectrophotometer at a wave length of 7000 Angstrom units. The turbidity was then calculated by the formula $$\text{Turbidity } (K/c) = \frac{K \times V}{0.5 \times s}$$

where V is the volume in cubic centimeters to which the sample was diluted, and S is the solids content of the sample in grams per liter.

The approximate weight average particle diameter was read from a graph of turbidity vs. particle size calculated by the formula $$K/c = \frac{k_1 \left(\frac{1}{5-n}\right) \alpha \left(\frac{n+2}{3}\right) (k_2 D)^{n-1}}{\lambda n}$$

where $K/c$ is the turbidity, $\lambda$ is the wavelength of the light, D is the average particle diameter, $\alpha$ is $$\frac{\mu - \mu_0}{c}$$

where $\mu$ is the index of refraction of the polymer, and $\mu_0$ is the index of refraction of water, and $c$ is the concentration, $n$ is the exponent for the dependence of scattering on the wavelength (3.0 for these systems), $k_1$ is $$\frac{32\pi^3 \mu_0^2}{2.303 \times 3}$$

and $k_2$ is $$\left(\frac{\pi \rho}{6}\right)^{1/3}$$

where $\rho$ is the density of the polymer.

*Example II*

To 250 parts of the original latex of Example I was added 165 parts of hexane and 60 parts of water, increasing the ratio of organic phase to water phase from 1/1 to 1.6/1. The mixture was agitated at 50°–60° C. for 1½ hours. The hexane was then distilled off with steam and recovered by condensation. The latex was concentrated in a disc concentrator to a solids content of 49.4%.

The thus treated latex had a viscosity of 38 centipoises, and a surface tension of 43 dynes/cm., and an average particle diameter (calculated from turbidity) of 1500 Angstrom units.

*Example III*

To portions of 100 parts of the original latex of Example I were added 31, 63 and 126 parts respectively, of ethylene dichloride. The mixtures were agitated at 55 to 65° C. for one hour, after which the ethylene dichloride was removed by steam distillation.

The surface tension of the thus treated latices were 49, 35 and 34 dynes/cm. respectively, and the average particle diameters were about 1300, 2000 and 3200 Angstrom units respectively.

*Example IV*

The addition of swelling agent may be made incrementally with heating after each addition as shown in this example.

A 50% solids latex of a copolymer of 50 parts of butadiene and 50 parts of styrene, prepared similarly to the latex of Example I was used. Increments of 11 parts of benzene were added to the latex at 55° C. with ½ hour of agitation after each addition. A small sample of the latex was taken for study after each agitation period at the time another increment of benzene was added.

The original latex (organic phase/water phase 1/1) had a turbidity of 0.44 and average particle diameter of 1300 Angstrom units. After heating with addition of the first 11 parts of benzene (organic phase/water phase 1.2/1), the latex had a turbidity of 0.47 and average particle diameter of 1350 Angstrom units, showing insufficient ratio of organic phase to water phase to effectively increase the particle size. After heating with addition of the second 11 parts of benzene (organic phase/water phase 1.4/1), the latex had a turbidity of 0.71 and average particle diameter of 1600 Angstrom units. After heating with additions of the third and fourth increments of 11 parts of benzene (organic phase/water phase 1.7/1 and 1.9/1 respectively), the latex had a turbidity of 1.62 and 2.05 respectively, and an average particle diameter of 2400 and 2800 Angstrom units respectively. The above illustrates the minimum ratio of organic phase to water phase of 1.4 necessary to increase the average particle diameter a minimum of 300 Angstrom units.

The incremental addition of swelling agent avoids the high viscosities sometimes encountered when all the swelling agent is added at once, and also allows closer control over the process.

*Example V*

This example shows the necessity for high ratio of organic phase to water phase in a series of individual latex treatments.

To portions of 200 parts of a 50% solids latex (organic phase/water phase of 1/1) of a copolymer of 50 parts of butadiene and 50 parts of styrene prepared similarly to the latex of Example I were added 88 parts of benzene. To three portions were also added 60, 33 and 14 parts of water respectively, giving organic phase/water phase ratios of 1.2/1, 1.4/1 and 1.7/1. One portion to which no water was added with the benzene had a ratio of organic phase/water phase of 1.9/1. The latices were agitated at 50° C. for two hours. The original latex had a turbidity of 0.25 and average particle diameter of 1000 Angstrom units. The treated latices with ratio of organic phase/water phase of 1.2/1, 1.4/1, 1.7/1, and 1.9/1 had turbidities of 0.31, 0.42, 0.64 and 1.13, respectively, and average particle diameters of 1100, 1300, 1600 and 2000 Angstrom units, respectively. Although the same amount of benzene was added to all the latices, it is shown that where the ratio of organic phase to water phase during the heating is less than 1.4/1, effective increase of particle size is not accomplished.

Where a water-insoluble organic liquid that is not a swelling agent for the synthetic rubber in the latex is used, coagulation may result. For example, the addition of 82 parts of diisobutyl carbinol to 200 parts of the above latex caused practically complete coagulation of the latex on heating. Diisobutyl carbinol swelled a sample of the rubber from the latex only to the extent of 4% after 72 hours at room temperature. Benzene, on the other hand, completely dissolved (infinite swelling) a sample of the same polymer under the same conditions. The hexane of Example VI swelled the sample of the rubber to the extent of over 400% in the same treatment.

*Example VI*

This example shows the use of butadiene and styrene as agglomerating agents which are especially desirable in enlarging the particle size of polybutadiene and butadiene-styrene copolymer latices.

A polybutadiene latex was prepared by polymerizing at 5° C. 100 parts of butadiene in a conventional polymerization recipe similar to that shown in Example I in 140 parts of water containing 4.0 parts of potassium soap of disproportionated abietic acid as emulsifier. A similar latex was prepared by polymerizing 75 parts of butadiene and 25 parts of styrene in 140 parts of water using the same recipe. Conversions were carried to nearly 100%, and the latices were then simultaneously stripped of residual monomers and concentrated to 48.6% solids in a disc concentrator. 0.2 part of potassium dimethyl dithiocarbamate shortstopper was added to the latices to assure no further polymerization during the subsequent particle enlarging treatment.

To 100 part portions of each of the above latices were added 32 parts of liquid butadiene (under pressure), 46 parts of styrene, and a mixture of 16 parts of butadiene and 23 parts of styrene, respectively. The mixtures were heated for 2 hours at 50° C., after which the butadiene and styrene were removed.

The original polybutadiene latex had a turbidity of 0.27 and average particle diameter of 1000 Angstrom units. After treating the portions with the butadiene, styrene, and mixture of butadiene and styrene, the latices had turbidities of 0.50, 0.55 and 0.50, respectively, and average particle diameters of 1400, 1450 and 1400 Angstrom units, respectively.

The original butadiene-styrene copolymer latex had a turbidity of 0.24 and average particle diameter of 950 Angstrom units. After treating the portions with the butadiene, styrene, and mixture of butadiene and styrene, the latices had turbidities of 0.41, 0.59 and 0.44, respectively, and average particle diameters of 1280, 1500 and 1300 Angstrom units, respectively.

*Example VII*

To 100 part portions of the latex of Example V were added 43 parts of toluene. One portion was treated at 3° C. for 3.5 hours. Another portion was treated at 50° C. for 1.5 hours. Another portion was treated at 80° C. for 1 hour. At the end of the treating periods, the toluene was removed by distillation. The average particle diameters of the thus treated latices were 2750, 2700 and 2600 Angstrom units.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of increasing the particle size of a butadiene polymer synthetic rubber latex having a weight ratio of synthetic rubber to water phase in the range from .5/1 to 1.2/1 and having an average particle diameter, based on the weight of the particles, of from 600 to 3000 Angstrom units which comprises mixing water-insoluble organic liquid swelling agent for the synthetic rubber selected from the group consisting of hydrocarbons and halogenated hydrocarbons with the latex in amount to increase the weight ratio of organic phase, viz. synthetic rubber and swelling agent, to water phase to the range from 1.4/1 to 3/1, maintaining the latex in contact with the swelling agent at a temperature between the freezing point of the latex and 100° C. without formation of additional polymer until the average particle diameter of the latex has increased at least 300 Angstrom units, and removing the swelling agent.

2. The method of increasing the particle size of a synthetic rubber latex emulsion polymerizate of butadiene and up to an equal weight of styrene, said latex having a weight ratio of synthetic rubber to water phase in the range from .5/1 to 1.2/1 and having an average particle diameter, based on the weight of the particles, of from 600 to 3000 Angstrom units which comprises mixing water-insoluble organic liquid swelling agent for the synthetic rubber selected from the group consisting of hydrocarbons and halogenated hydrocarbons with the latex in amount to increase the weight ratio of organic phase, viz. synthetic rubber and swelling agent, to water phase to the range from 1.4/1 to 3/1, maintaining the latex in contact with the swelling agent at a temperature between the freezing point of the latex and 100° C. without formation of additional polymer until the average particle diameter of the latex has increased at least 300 Angstrom units, and removing the swelling agent.

3. The method of increasing the particle size of a synthetic rubber latex emulsion polymerizate of butadiene-1,3 and up to an equal weight of styrene, said latex having a weight ratio of synthetic rubber to water phase in the range from .5/1 to 1.2/1 and having an average particle diameter, based on the weight of the particles, of from 600 to 3000 Angstrom units which comprises mixing with the latex butadiene-1,3 and styrene in amount to increase the weight ratio of organic phase, viz. synthetic rubber and butadiene-1,3 and styrene, to water phase to the range from 1.4/1 to 3/1, maintaining the latex in contact with the butadiene-1,3 and styrene at a temperature between the freezing point of the latex and 100° C. without formation of additional polymer until the average particle diameter of the latex has increased at least 300 Angstrom units, and removing the butadiene-1,3 and styrene.

4. The method of increasing the particle size of a butadiene polymer synthetic rubber latex having a weight ratio of synthetic rubber to water phase in the range from .5/1 to 1.2/1 and having an average particle diameter, based on the weight of the particles, of from 600 to 1200 Angstrom units which comprises mixing water-insoluble organic liquid swelling agent for the synthetic rubber selected from the group consisting of hydrocarbons and halogenated hydrocarbons with the latex in amount to increase the weight ratio of organic phase, viz. synthetic rubber and swelling agent, to water phase to the range from 1.4/1 to 3/1, maintaining the latex in contact with the swelling agent at a temperature between the freezing point of the latex and 100° C. without formation of additional polymer until the average particle diameter of the latex has increased at least 300 Angstrom units, and concentrating the latex and concurrently removing the swelling agent.

References Cited in the file of this patent

UNITED STATES PATENTS

| | | |
|---|---|---|
| 2,441,523 | Ward | May 11, 1948 |
| 2,495,135 | Rodman | Jan. 17, 1950 |
| 2,514,207 | Johnson | July 4, 1950 |